US011992445B2

(12) United States Patent
Dahbali

(10) Patent No.: US 11,992,445 B2
(45) Date of Patent: May 28, 2024

(54) NONMETALLIC WHEELCHAIR

(71) Applicant: JETWEELS INC., Jamaica, NY (US)

(72) Inventor: Asmahan Dahbali, Jamaica, NY (US)

(73) Assignee: JETWEELS INC., Jamaica, NY (US)

( * ) Notice: Subject to any disclaimer, the term of this patent is extended or adjusted under 35 U.S.C. 154(b) by 0 days.

(21) Appl. No.: 17/859,504

(22) Filed: Jul. 7, 2022

(65) Prior Publication Data

US 2022/0339046 A1 Oct. 27, 2022

Related U.S. Application Data

(63) Continuation of application No. 16/474,546, filed as application No. PCT/US2018/012757 on Jan. 8, 2018, now Pat. No. 11,406,546.

(51) Int. Cl.
*A61G 5/10* (2006.01)
*A61G 5/12* (2006.01)

(52) U.S. Cl.
CPC ............. *A61G 5/10* (2013.01); *A61G 5/1018* (2013.01); *A61G 5/125* (2016.11); *A61G 5/128* (2016.11); *A61G 2203/76* (2013.01)

(58) Field of Classification Search
CPC .......... A61G 5/10; A61G 5/125; A61G 5/127; A61G 5/128; A61G 5/1018; A61G 2203/76
See application file for complete search history.

(56) References Cited

U.S. PATENT DOCUMENTS

| | | |
|---|---|---|
| 3,216,738 A | 11/1965 | Bockus |
| 3,669,107 A | 6/1972 | Posey |
| 4,770,432 A | 9/1988 | Wagner |
| 5,101,536 A | 4/1992 | Gabriele |
| 5,240,276 A | 8/1993 | Coombs |
| 6,161,848 A | 12/2000 | Beumer et al. |
| 6,315,306 B1 | 11/2001 | Fernie et al. |
| 6,338,493 B1 | 1/2002 | Wohlgemuth et al. |
| 6,412,795 B1 | 7/2002 | Beumer et al. |
| 6,769,705 B1 | 8/2004 | Schlangen |
| 7,832,807 B2 | 11/2010 | Shickle |
| 8,888,118 B2 | 11/2014 | Paul et al. |
| 8,967,635 B2 | 3/2015 | Paul et al. |
| 9,016,706 B2 | 4/2015 | Paul et al. |
| 9,084,710 B2 | 7/2015 | Paul et al. |
| 9,198,814 B2 | 12/2015 | Paul et al. |
| 9,775,753 B2 | 10/2017 | Johnson et al. |

(Continued)

FOREIGN PATENT DOCUMENTS

| | | |
|---|---|---|
| EP | 3254657 B1 | 12/2018 |
| JP | 2014108197 A | 6/2014 |
| WO | 2006026810 A1 | 3/2006 |

OTHER PUBLICATIONS

International Search Report issued in International Application PCT/US2018/012757, dated Mar. 19, 2018, 1 page.

*Primary Examiner* — Kevin Hurley
*Assistant Examiner* — Michael R Stabley
(74) *Attorney, Agent, or Firm* — Dilworth IP, LLC

(57) ABSTRACT

A wheelchair including a transparent frame including a first side panel, a second side panel, a back section between the first and second side panels, and a seat section between the first and second side panels, a plurality of wheels rotatably coupled to the frame, and at least one handle coupled to the frame, wherein the wheelchair is entirely nonmetallic.

21 Claims, 18 Drawing Sheets

(56) References Cited

U.S. PATENT DOCUMENTS

| | | | | |
|---|---|---|---|---|
| 10,131,372 | B2 | 11/2018 | Bod | |
| 10,555,855 | B2 | 2/2020 | Johnson et al. | |
| 2003/0042779 | A1* | 3/2003 | Yamasaki | A61G 5/1067 297/45 |
| 2004/0084870 | A1 | 5/2004 | Ward et al. | |
| 2008/0041282 | A1 | 2/2008 | Goschy et al. | |
| 2008/0265542 | A1 | 10/2008 | Chong | |
| 2011/0079974 | A1* | 4/2011 | Ambrefe, Jr. | B62B 1/26 280/79.3 |
| 2016/0102752 | A1 | 4/2016 | Yelvington | |

* cited by examiner

NONMETALLIC WHEELCHAIR

FIELD OF THE INVENTION

The present disclosure relates to wheelchairs, and more particularly, to a nonmetallic and/or transparent wheelchair.

BACKGROUND

Traditional manual wheelchairs are made of metal materials which does not fulfill the need of industry where metal is not allowed due to restrictions and security requirements.

Presently, metal detectors are utilized in airports, bus depots, train stations, and many buildings, wheelchair using passengers and visitors must get out of and arise from their wheelchair to allow security personnel to perform manual checks for security purposes. Passengers using wheelchairs have to undergo manual inspection and must be moved to another wheelchair after the security checkpoint. The process takes time and effort, but the present invention simplifies and eases travelling procedures. For the airport example, this security check process causes delays to flights and makes airports congested with long queues. Additionally, passengers who use wheelchairs feel discriminated due to the process of security checks. The present invention satisfies the need to avoid discrimination and to avoid delays of flights. The present invention will also reduce the costs associated with the extra time and manpower required by airport security that screens wheelchair using passengers.

For swimming pools, bathing, and other wet and humid areas, the present invention is advantageous over traditional wheelchairs, as the nonmetallic wheelchair will not rust and corrode in these environments. The present invention may also be utilized in hospitals and other institutions where metal objects are not allowed. For example, most hospitals use Magnetic Resonance Imaging (MRI) equipment, and the traditional wheelchairs may interfere with the MRI equipment, whereas the present invention may be utilized safely with MRI equipment.

SUMMARY

The present invention provides a nonmetallic wheelchair that meets industry requirements. Novel and innovative features of the present invention include transparency and fully nonmetallic made wheelchair. Preferably, the material used is transparent polycarbonate plastic which has acceptable physical and mechanical properties. The present invention may be utilized in different applications which include, but are not limited to, airports, swimming pools, bathing, and hospitals.

An object of the present invention is a nonmetallic wheelchair comprising a frame, a left armrest, a right armrest, a footrest, a left rear wheel, a right rear wheel, a left front wheel, a right front wheel, a left handle, and, a right handle. The frame comprises a main left panel, a main right panel, a back section, and, a seat section. The back section is coupled to the main left panel, the main right panel, and the seat section. The seat section is coupled to the main left panel and the main right panel. The left armrest is pivotally coupled to the main left panel. The right armrest is pivotally coupled to the main right panel. The footrest is pivotally coupled to the main left panel and to the main right panel. The left rear wheel is coupled to the main left panel. The right rear wheel is coupled to the main right panel. The left front wheel is coupled to the main left panel. The right front wheel is coupled to the main right panel. The left handle is coupled to the frame. The right handle is coupled to the frame. The frame, the left armrest, the right armrest, and the footrest are made of a first nonmetallic material.

In yet another object of the present invention, the nonmetallic wheelchair further comprises a seatbelt, a seatbelt buckle, a seatbelt adjuster, a kneestrap, a kneestrap buckle, and a kneestrap adjuster. The seatbelt buckle and the seatbelt adjuster are adapted to adjust the seatbelt to secure a user to the nonmetallic wheelchair. The kneestrap buckle and the kneestrap adjuster are adapted to adjust the kneestrap to secure the user to the nonmetallic wheelchair. The seatbelt buckle, the seatbelt adjuster, the kneestrap buckle, and the kneestrap adjuster are made of a second nonmetallic material.

In another object of the present invention, the nonmetallic wheelchair further comprises a baggage tray. The baggage tray is pivotally coupled to the main left panel and to the main right panel. The baggage tray is made of a third nonmetallic material.

In yet another object of the present invention, the nonmetallic wheelchair further comprises a braking mechanism. The braking mechanism comprises a lever, a connector rod, and, a braking pad. The lever is pivotally coupled to the connector rod. The connector rod is coupled to the braking pad. The lever pivots between a locked position and a released position. The braking mechanism is made of a fourth nonmetallic material. The braking pad is in contact with the left rear wheel when the lever is in the locked position.

In another object of the present invention, the nonmetallic wheelchair further comprises a second braking mechanism. The second braking mechanism comprises a second lever, a second connector rod, and, a second braking pad. The second lever is coupled to the second connector rod. The second connector rod is coupled to the second braking pad. The second lever pivots between a second locked position and a second released position. The second braking mechanism is made of a fifth nonmetallic material. The second braking pad is in contact with the right rear wheel when the second lever is in the second locked position.

In yet another object of the present invention, the left rear wheel, the right rear wheel, the left front wheel, the right front wheel, the left handle, and the right handle are made of a sixth nonmetallic material.

In another object of the present invention, the nonmetallic wheelchair further comprises a plurality of radial ball bearings. The plurality of radial ball bearings are made of a seventh nonmetallic material.

In yet another object of the present invention, the nonmetallic wheelchair further comprises a left grip and a right grip. The left grip is coupled to the left handle. The right grip is coupled to the right handle. The left grip and the right grip are made of an eighth nonmetallic material.

In another object of the present invention, the frame further comprises a left tipping lever and a right tipping lever.

In yet another object of the present invention, the nonmetallic wheelchair is configured to be stackable. The frame further comprises a left rubber stopper and a right rubber stopper.

In another object of the present invention, the frame further comprises at least one support rod.

In another object of the present invention, each of the first, second, third, fourth, fifth, sixth, seventh and eighth nonmetallic material is selected from the group consisting of polycarbonate, rubber, clear rubber, wood, carbon fiber, thermoplastics, clear polycarbonate, tinted polycarbonate, ultraviolet resistant polycarbonate, methyl methacrylate, glass, transparent composites, glass fibers, resins, transparent fiber-reinforced composites, transparent plastic polymers, general purpose polystyrene, styrene acrylonitrile, styrene methyl methacrylate, poly(methyl methacrylate), and combinations thereof.

In yet another object of the present invention, each of the first, second, third, fourth, fifth, sixth, seventh and eighth nonmetallic material is polycarbonate.

In another object of the present invention, the polycarbonate is transparent.

In yet another object of the present invention, the eighth nonmetallic material is clear rubber.

In another object of the present invention, the clear rubber is transparent.

BRIEF DESCRIPTION OF THE DRAWINGS

The advantages and features of the present invention will be better understood as the following description is read in conjunction with the accompanying drawings, wherein.

DETAILED DESCRIPTION

Figure 1:
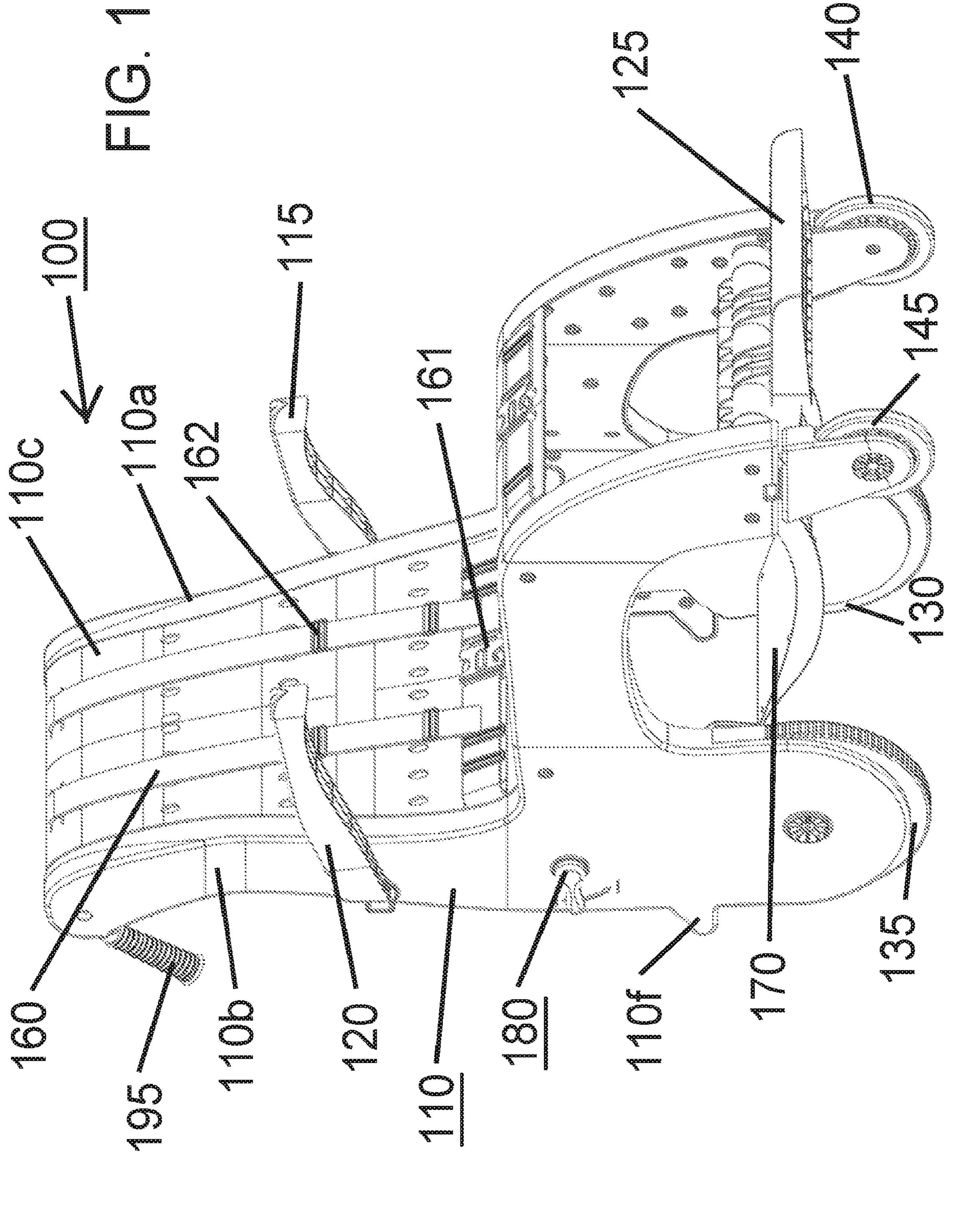
FIG. 1 is a perspective view of an embodiment of the present invention.

The figures illustrate embodiments of the present, wherein a nonmetallic wheelchair 100 which comprises a frame 110, a left armrest 115, a right armrest 120, a footrest 125, a left rear wheel 130, a right rear wheel 135, a left front wheel 140, a right front wheel 145, a left handle 150, and a right handle 155. The frame 110 comprises a main left panel 110*a*, a main right panel 110*b*, a back section 110*c*, and a seat section 110*d*. The back section 110*c* is coupled to the main left panel 110*a*. The back section 110*c* is also coupled to the main right panel 110*b*. The back section 110*c* is further coupled to the seat section 110*d*. The seat section 110*d* is coupled to the main left panel 110*a*. The seat section 110*d* is also coupled to the main right panel 110*b*.

The left armrest 115 is pivotally coupled to the main left panel 110*a*. The right armrest 120 is pivotally coupled to the main right panel 110*b*. The left armrest 115 and the right armrest 120 are illustrated in FIGS. 1-6 and 9 in a position to allow a user to rest her arms. Either one or both of the left armrest 115 and the right armrest 120 may be pivoted towards the top of the back section 110*c*, where the left armrest 115 and the right armrest 120 may be in a position to provide more comfort and room for the user's sides.

The footrest 125 is pivotally coupled to the main left panel 110*a* and to the main right panel 110*b*. The left rear wheel 130 is coupled to the main left panel 110*a*. The right rear wheel 135 is coupled to the main right panel 110*b*. The left front wheel 140 is coupled to the main left panel 110*a*. The right front wheel 145 is coupled to the main right panel 110*b*. The left handle 150 is coupled to the frame 110. The right handle 155 is coupled to the frame 110. The footrest 125 may optionally include a folding mechanism to allow the footrest 125 to folded out of the way, thereby allowing the user to place her feet on the ground.

Figure 14:
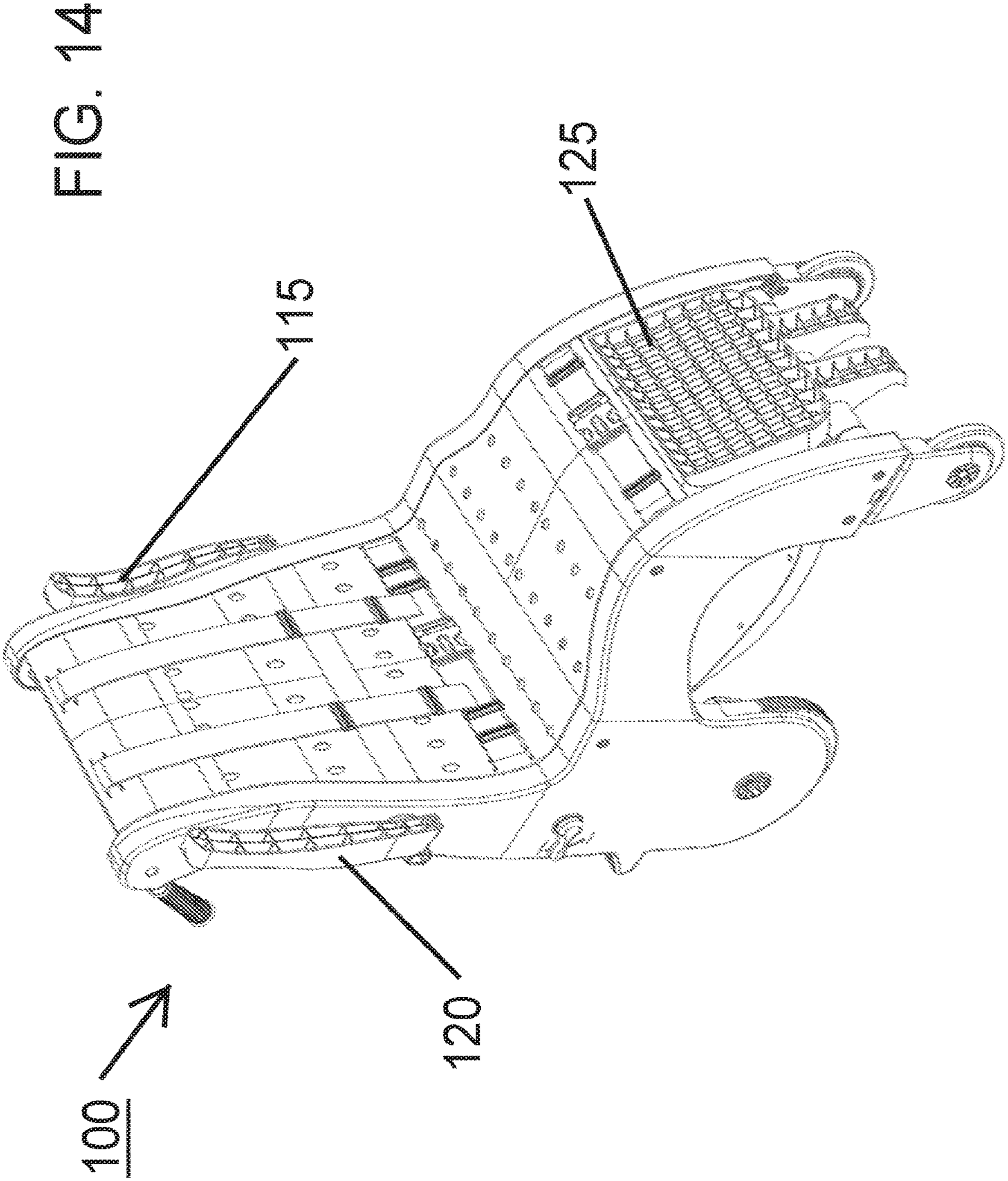
FIG. 14 is a perspective view of an embodiment of the present invention.
Figure 15:
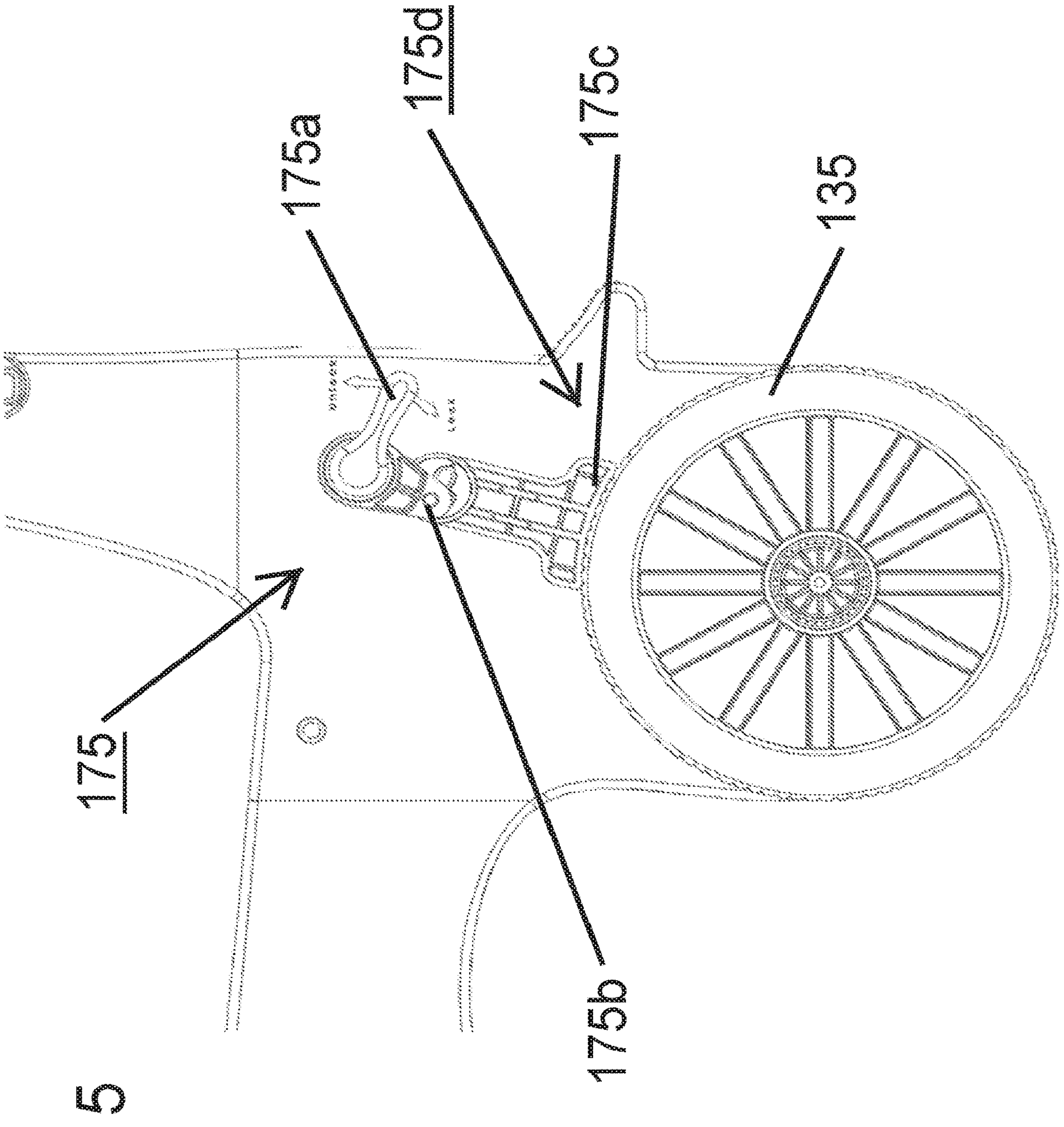
FIG. 15 is a perspective view of an embodiment of the braking mechanism of the present invention.
Figure 16:
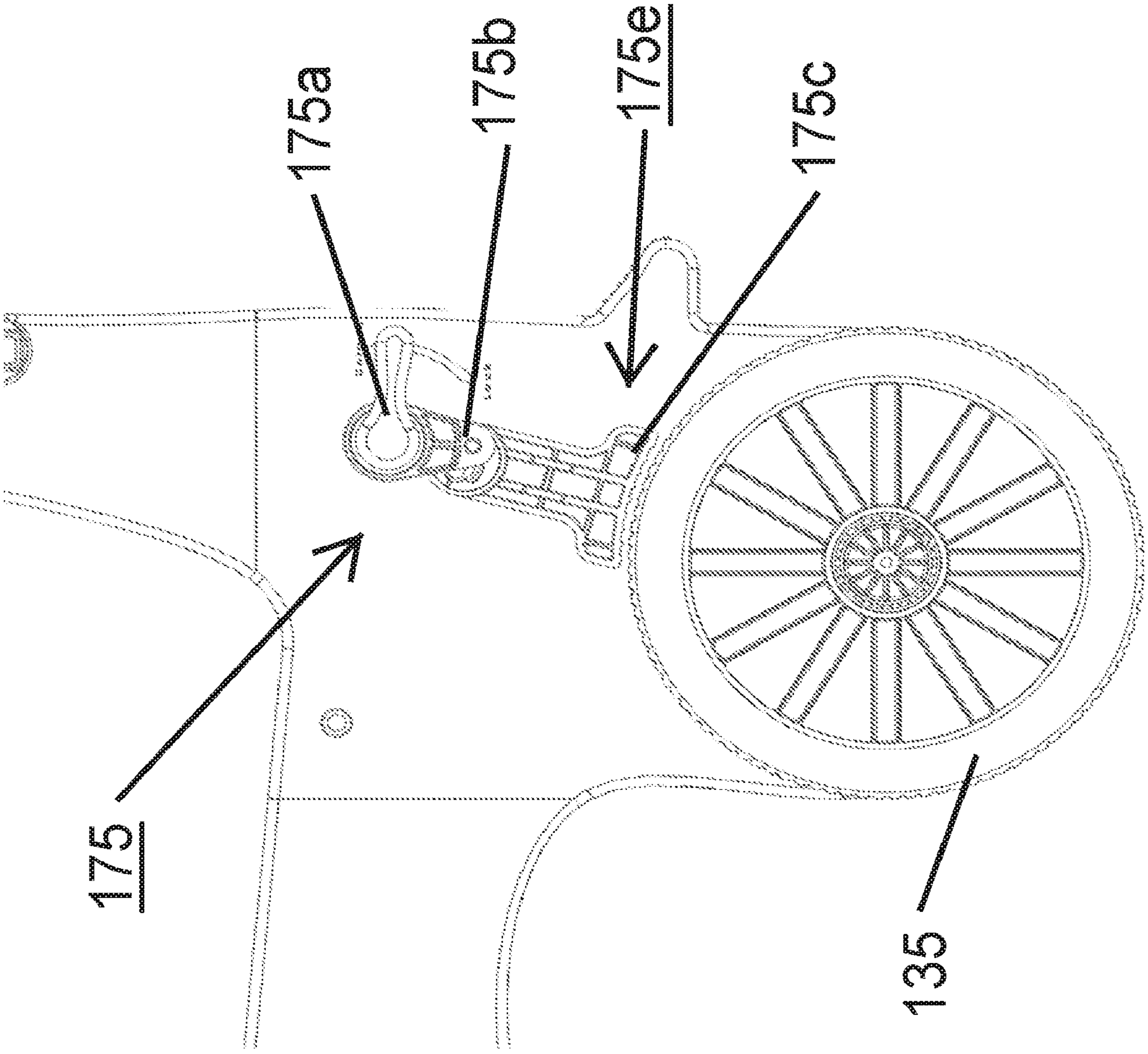
FIG. 16 is a perspective view of an embodiment of the braking mechanism of the present invention.
Figure 17:
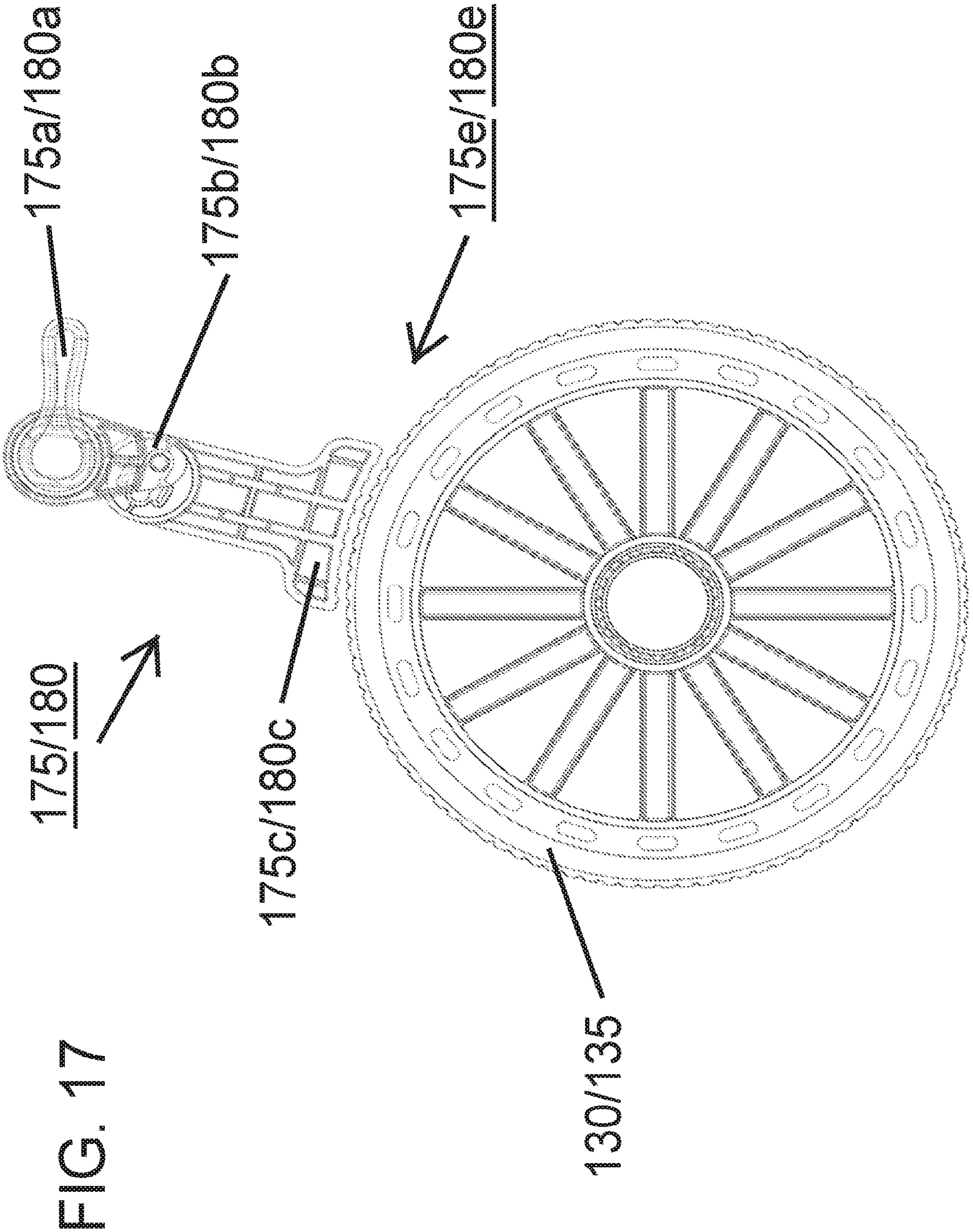
FIG. 17 is a perspective view of an embodiment of the braking mechanism of the present invention.
Figure 18:
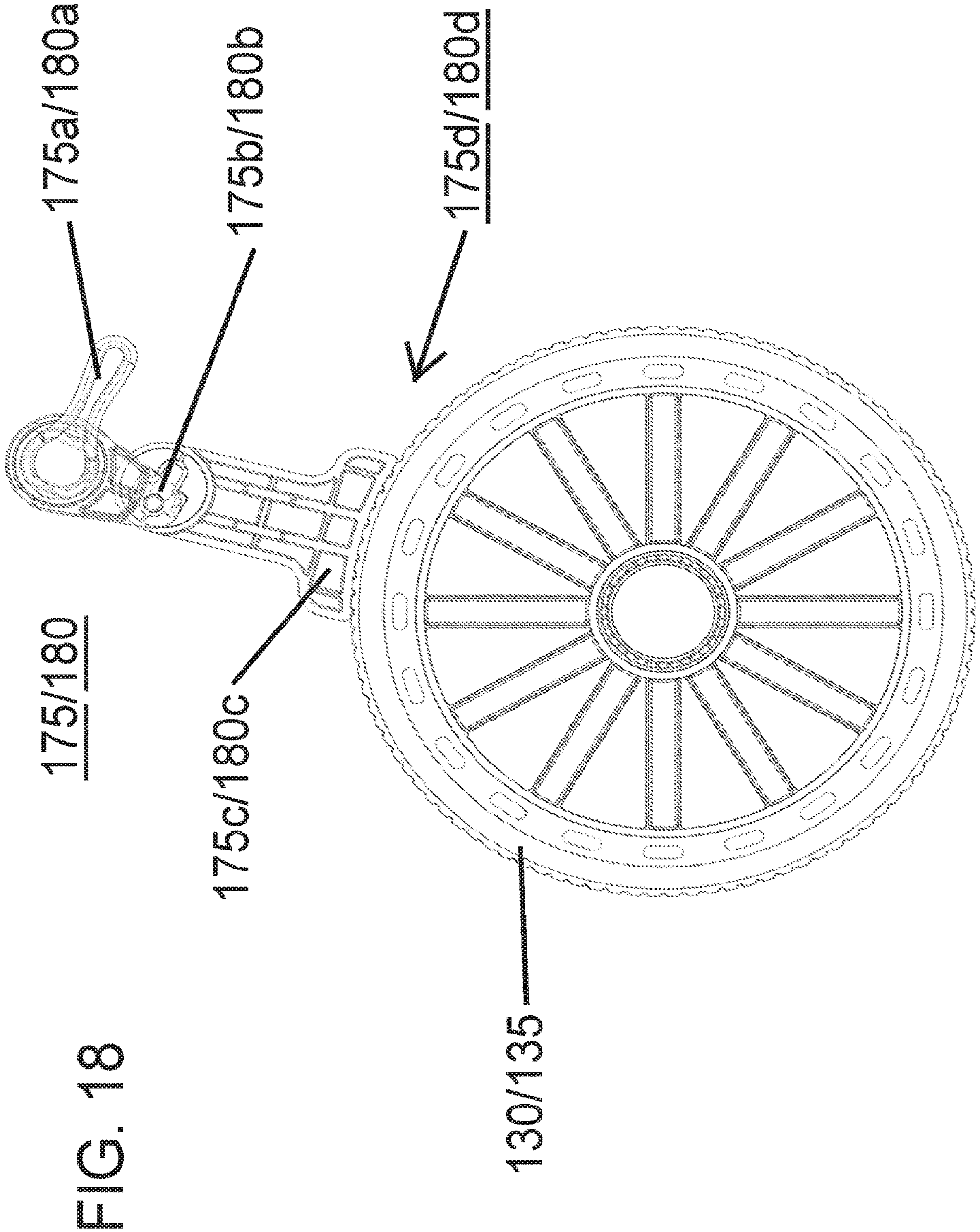
FIG. 18 is a perspective view of an embodiment of the braking mechanism of the present invention.

The left armrest 115, the right armrest 120 and the footrest 125 are illustrated in the upward pivoted position in FIG. 14. Although the figure illustrates all three in the upward pivoted position, each may be pivoted independently from the others. For example, for the comfort of the user, the left armrest 115 may be pivoted in the upward position, while the right armrest 120 may be pivoted in the downward position.

The frame 110, the left armrest 115, the right armrest 120, and the footrest 125 are made of a first nonmetallic material.

Figure 2:
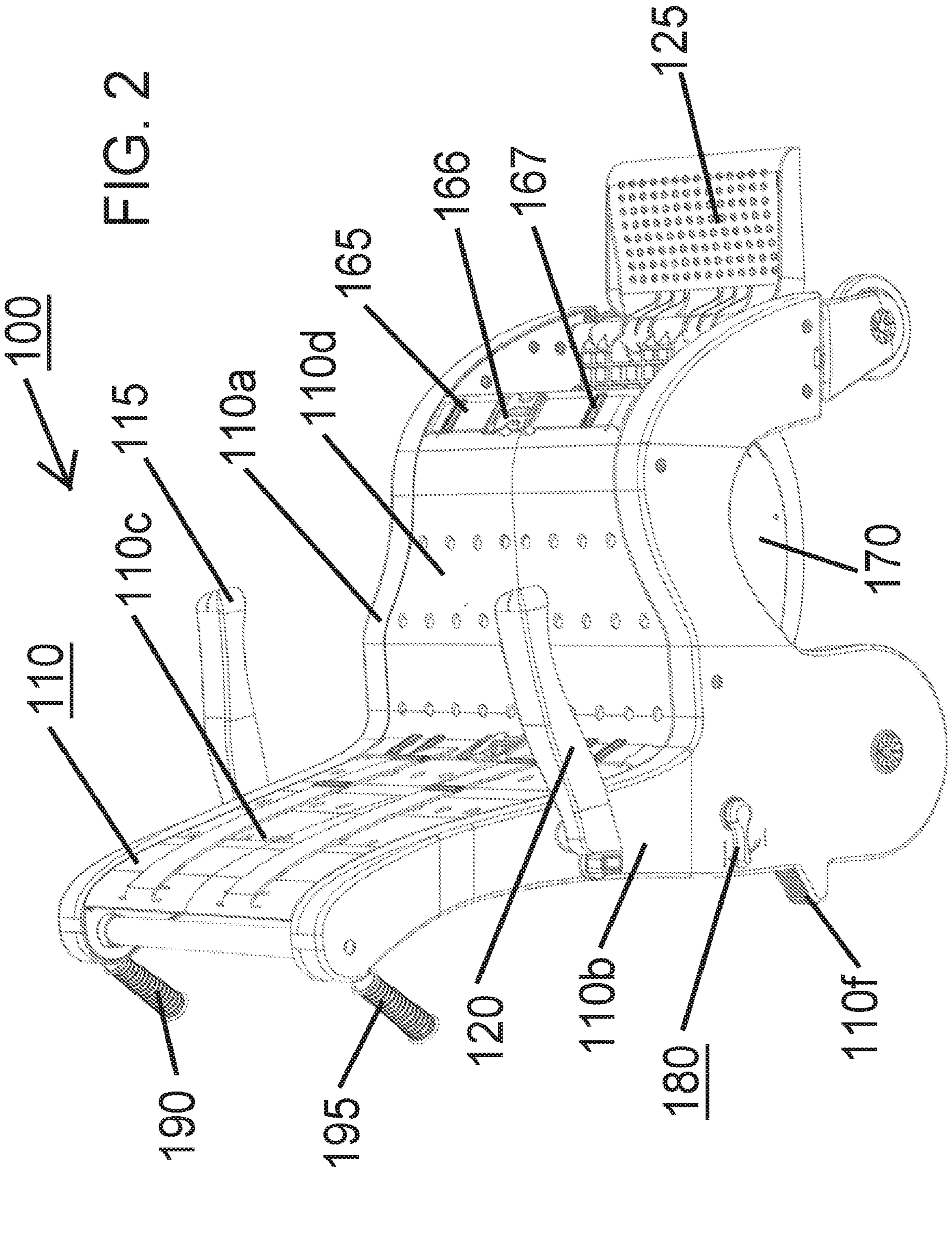
FIG. 2 is a perspective view of an embodiment of the present invention.

In some embodiments, the nonmetallic wheelchair 100 further comprises a seatbelt 160, a seatbelt buckle 161, and a seatbelt adjuster 162, as illustrated in FIG. 1. Some embodiments may have more than one seatbelt adjuster 162. Seatbelt adjusters 162 may be included to adjust the seatbelt 160 to fit and secure the user into the nonmetallic wheelchair 100. The seatbelt buckle 161 may be adapted to adjust the seatbelt 160 to secure the user to the nonmetallic wheelchair 100. In some embodiments, the nonmetallic wheelchair 100 may further comprise a kneestrap 165, a kneestrap buckle 166, and a kneestrap adjuster 167, as illustrated in FIG. 2. Some embodiments have more than one kneestrap adjuster 167. Kneestrap adjusters 167 may be included to adjust the kneestrap 165 to fit and secure the user into the nonmetallic wheelchair 100. The kneestrap buckle 166 may be adapted to adjust the kneestrap 165 to secure the user to the nonmetallic wheelchair 100. The seatbelt buckle 161, the seatbelt adjusters 162, the kneestrap buckle 166, and the kneestrap adjusters 167 may be made of a second nonmetallic material. The seatbelt 160 and the kneestrap 165 may be made of a transparent meshed fabric.

In other embodiments, the nonmetallic wheelchair 100 may further comprise a baggage tray 170. The baggage tray 170 is pivotally coupled to the main left panel 110*a* and to the main right panel 110*b*. The baggage tray 170 is made of a third nonmetallic material. The baggage tray 170 may be utilized to store the user's personal effects and belongings, such as carry-on bags. Furthermore, the baggage tray 170 may add to the structural integrity of the nonmetallic wheelchair 100.

In other embodiments, the nonmetallic wheelchair 100 may further comprise a braking mechanism 175. As illustrated in FIGS. 15-18, the braking mechanism 175 comprises a lever 175*a*, a connector rod 175*b*, and a braking pad 175*c*. The lever 175*a* is pivotally coupled to the connector rod 175*b*. The connector rod 175*b* is coupled to the braking pad 175*c*. The lever 175*a* pivots between a locked position 175*d* and a released position 175*e*. The braking mechanism 175 may be controlled by either the user in the nonmetallic wheelchair 100 or any person assisting the user or pushing the nonmetallic wheelchair 100. The braking mechanism 175 is made of a fourth nonmetallic material. The braking pad 175*c* is in contact with the left rear wheel 130 when the lever 175*a* is in the locked position 175*d*.

In other embodiments, the nonmetallic wheelchair 100 may further comprise a second braking mechanism 180. The second braking mechanism 180 comprises a second lever 180*a*, a second connector rod 180*b*, and a second braking pad 180*c*. The second lever 180*a* is coupled to the second connector rod 180*b*. The second connector rod 180*b* is coupled to the second braking pad 180*c*. The second lever 180*a* pivots between a second locked position 180*d* and a second released position 180*e*. The second braking mechanism 180 may be controlled by either the user in the nonmetallic wheelchair 100 or any person assisting the user or pushing the nonmetallic wheelchair 100. The second braking mechanism 180 is made of a fifth nonmetallic material. The second braking pad 180*c* is in contact with the right rear wheel 135 when the second lever 180*a* is in the second locked position 180*d*.

In some embodiments, the left rear wheel 130, the right rear wheel 135, the left front wheel 140, the right front wheel 145, the left handle 150, and the right handle 155 are made of a sixth nonmetallic material.

Figure 7:
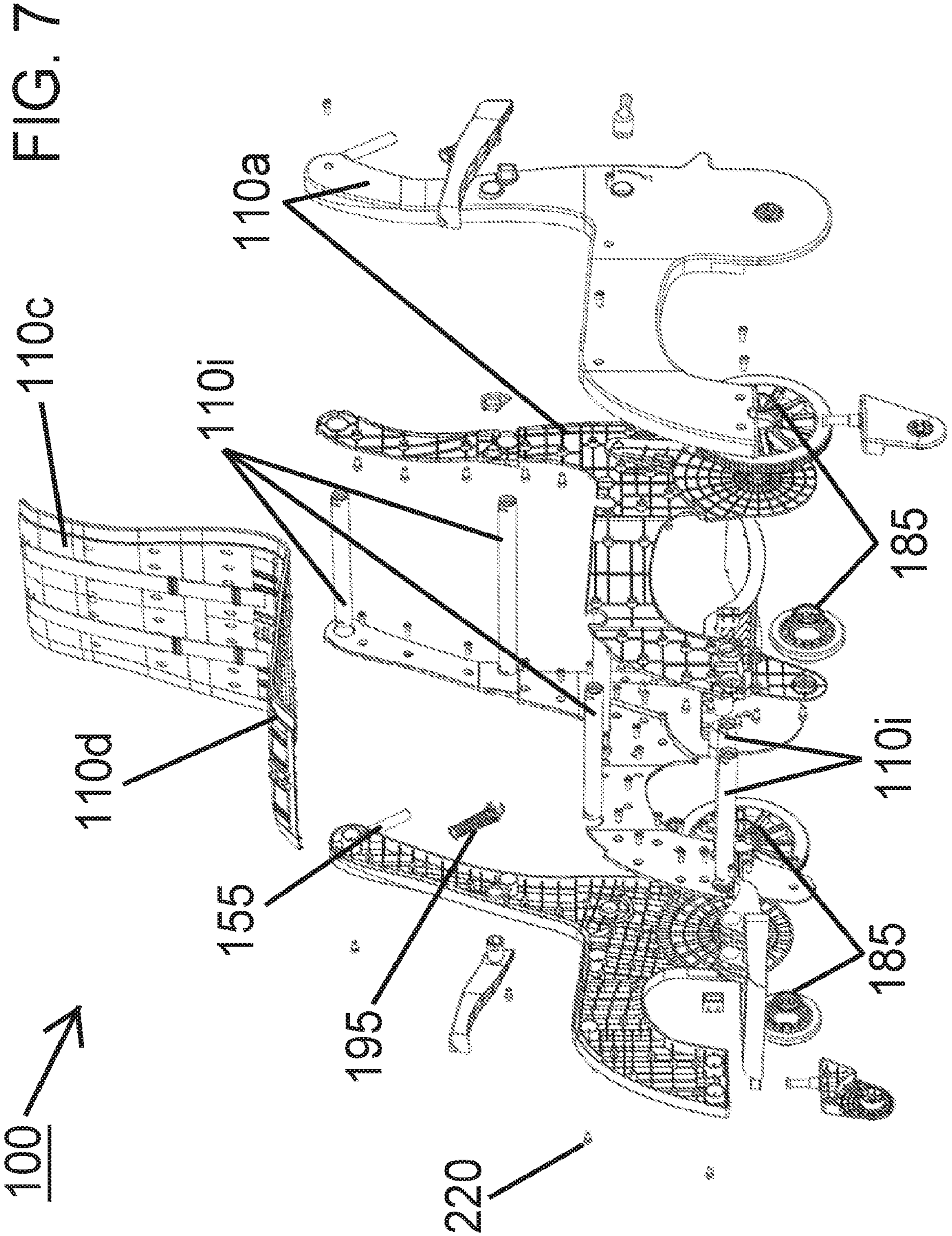
FIG. 7 is an exploded view of an embodiment of the present invention.
Figure 8:
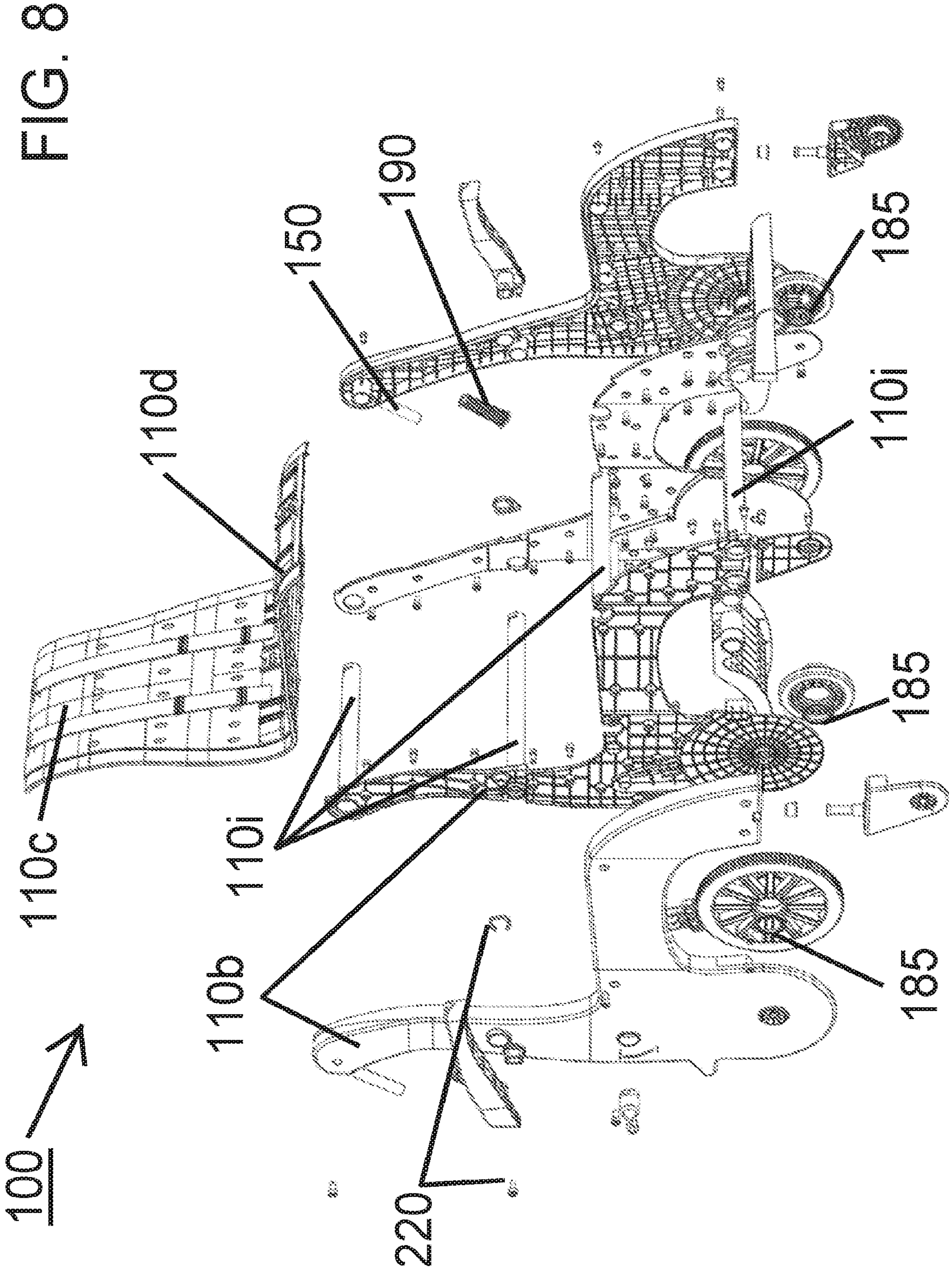
FIG. 8 is an exploded view of an embodiment of the present invention.

In some embodiments, the nonmetallic wheelchair 100 may further comprise a plurality of radial ball bearings 185, as illustrated in FIGS. 7 and 8. The plurality of radial ball bearings 185 are made of a seventh nonmetallic material. The plurality of radial ball bearings 185 makes driving, handling and maneuvering of the nonmetallic wheelchair 100 easier, better and smoother. The plurality of radial ball bearings 185 also reduce rotational friction and support radial and axial loads. The plurality of radial ball bearings 185 may also facilitate the coupling of the left rear wheel 130 and left front wheel 140 to the main left panel 110*a* and the coupling of the right rear wheel 135 and right front wheel 145 to the main right panel 110*b*.

In other embodiments, the nonmetallic wheelchair 100 may further comprise a left grip 190 and a right grip 195. The left grip 190 is coupled to the left handle 150. The right grip 195 is coupled to the right handle 155. The left grip 190 and the right grip 195 may be contoured or ridged to allow a person that pushing the nonmetallic wheelchair 100 to have a better hold on the left handle 150 and the right handle 155. The left grip 190 and the right grip 195 are made of an eighth nonmetallic material.

Figure 3:
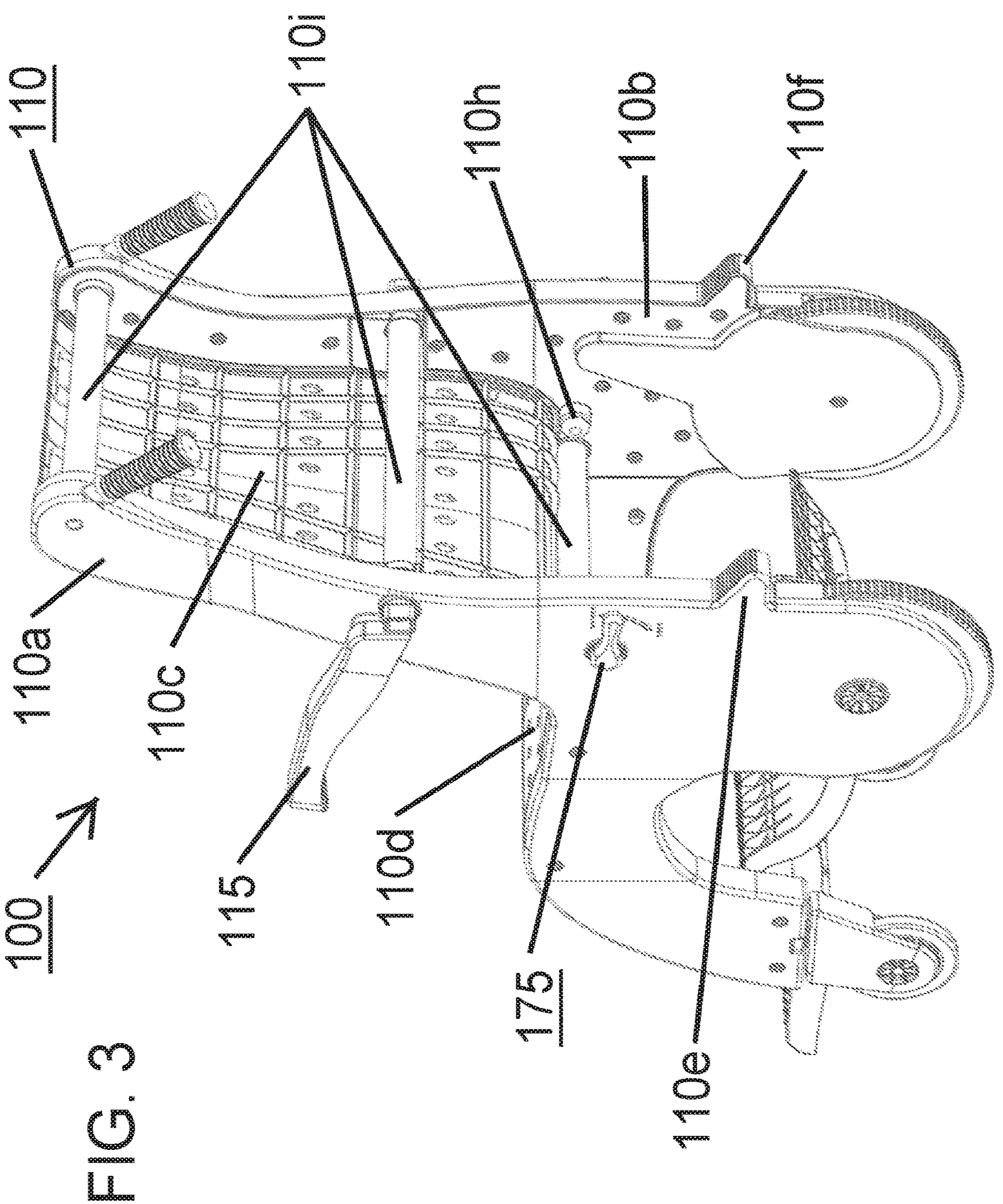
FIG. 3 is a perspective view of an embodiment of the present invention.
Figure 4:
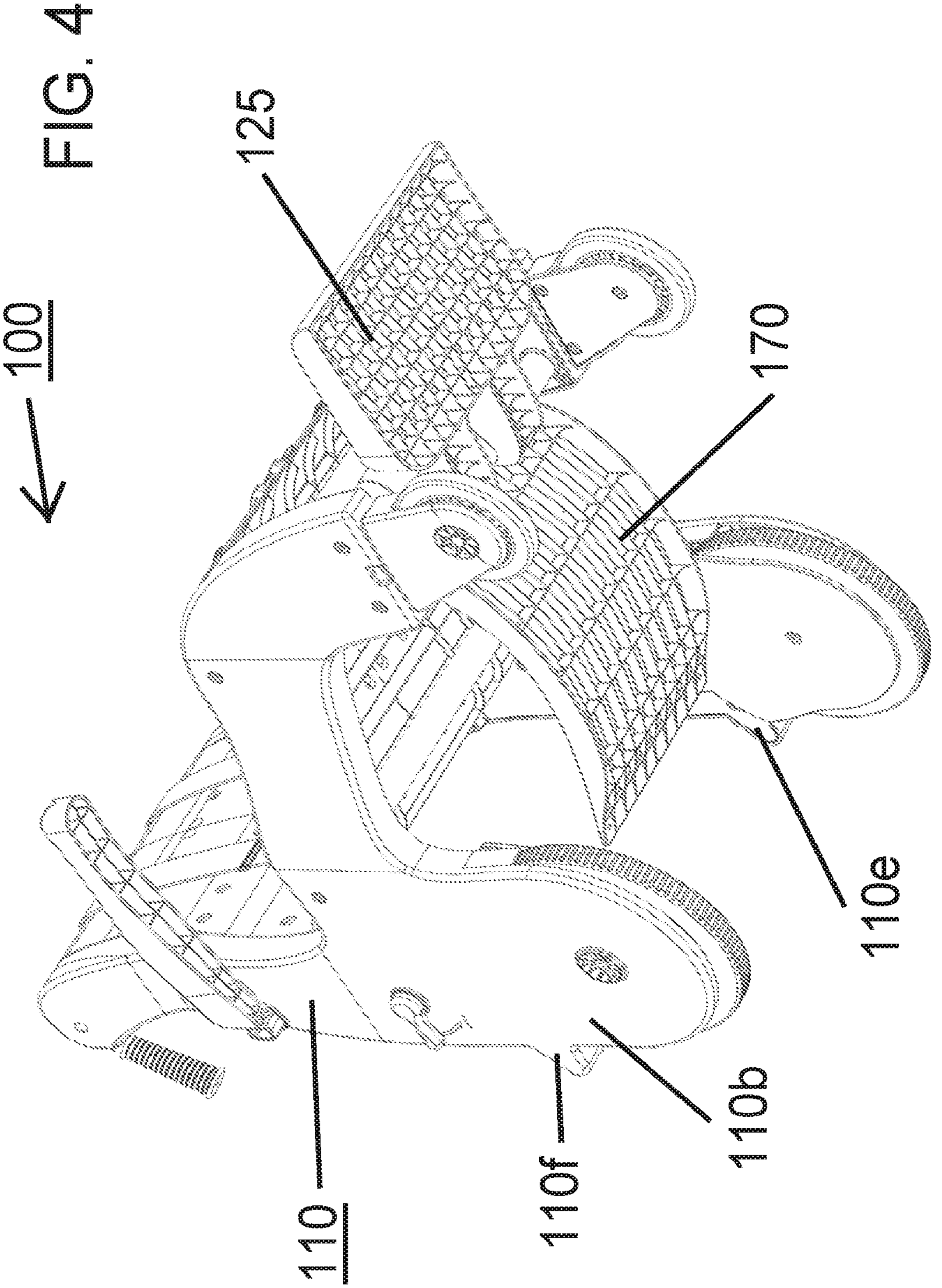
FIG. 4 is a perspective view of an embodiment of the present invention.
Figure 5:
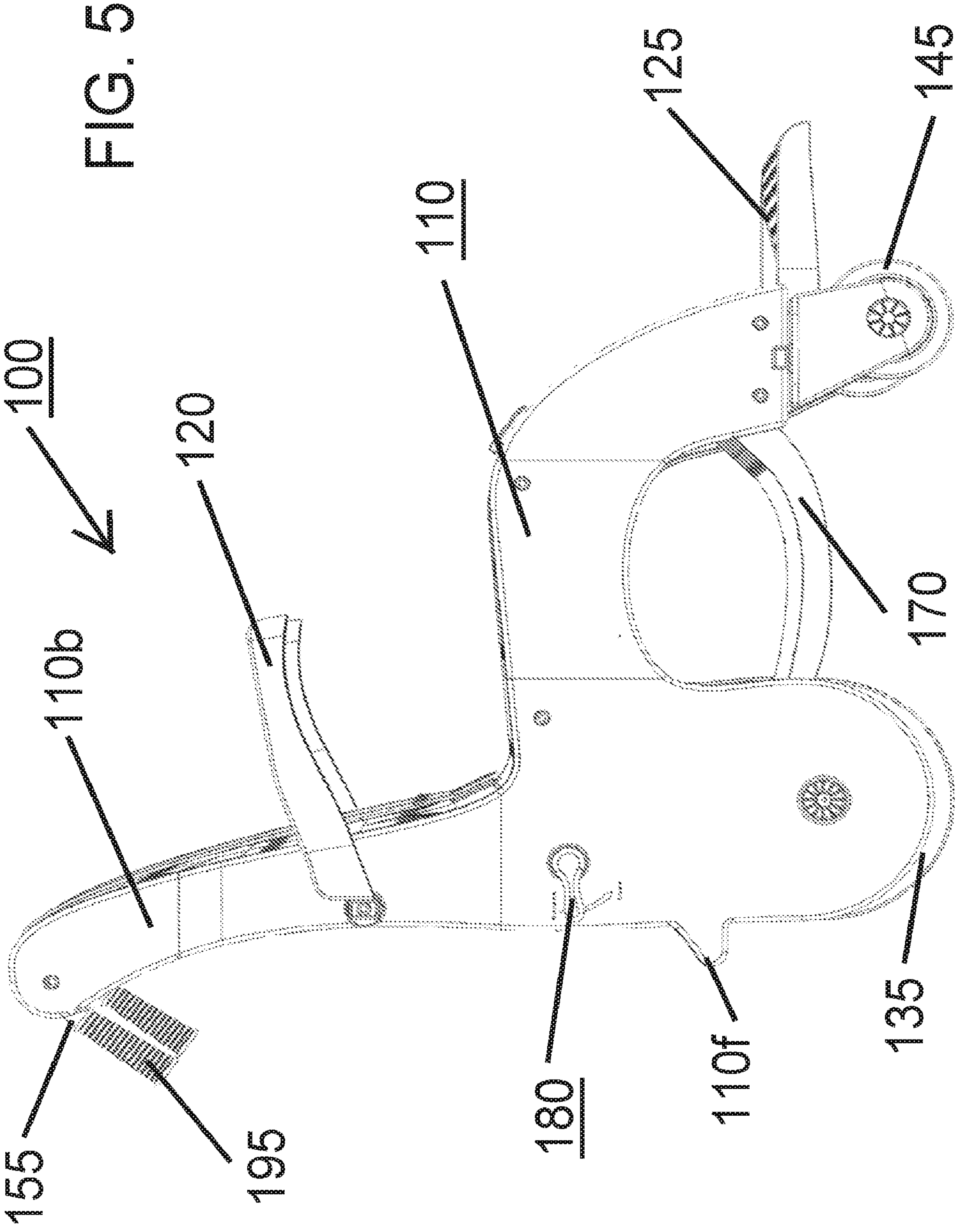
FIG. 5 is a right side view of an embodiment of the present invention.
Figure 6:
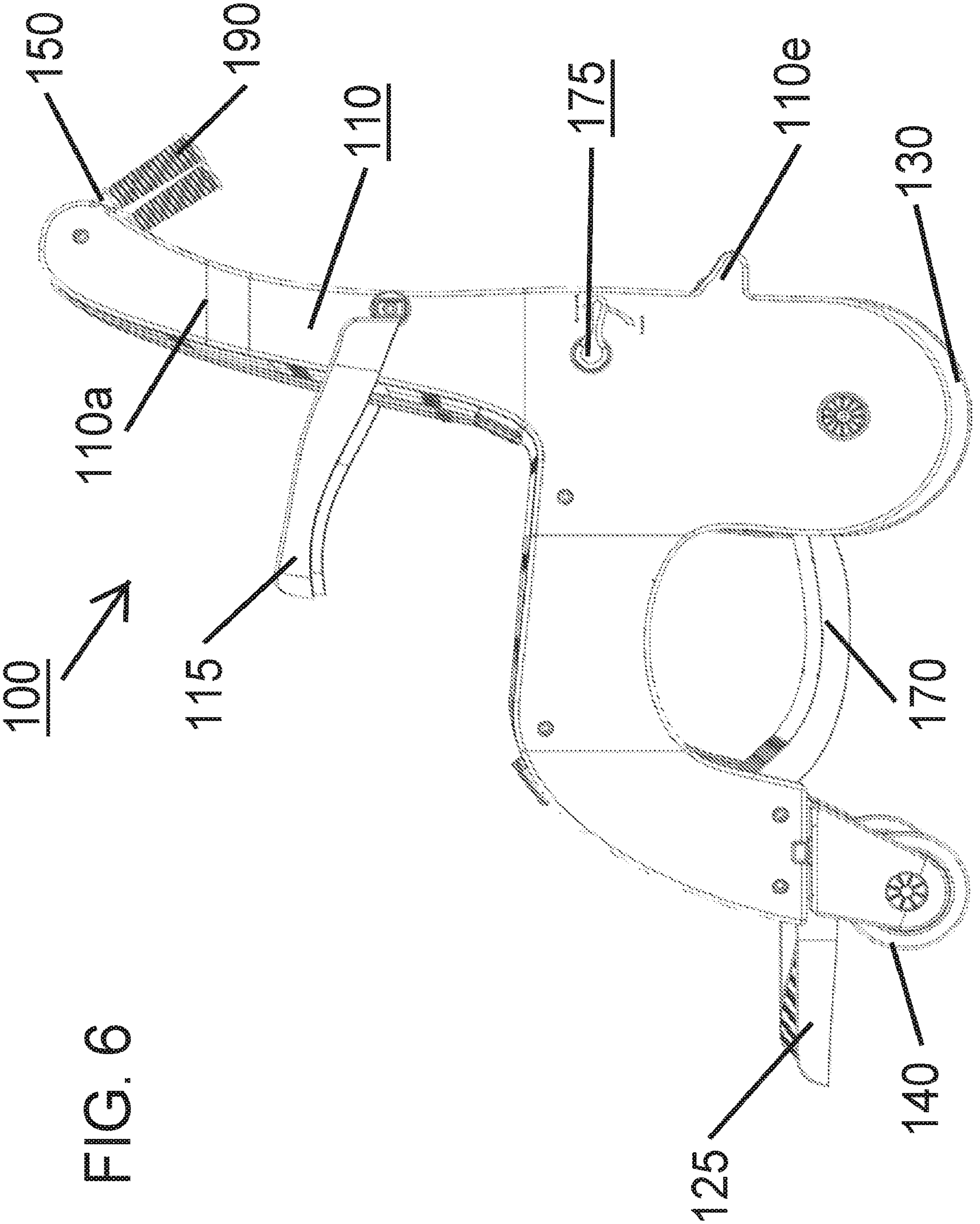
FIG. 6 is a left side view of an embodiment of the present invention.
Figure 9:
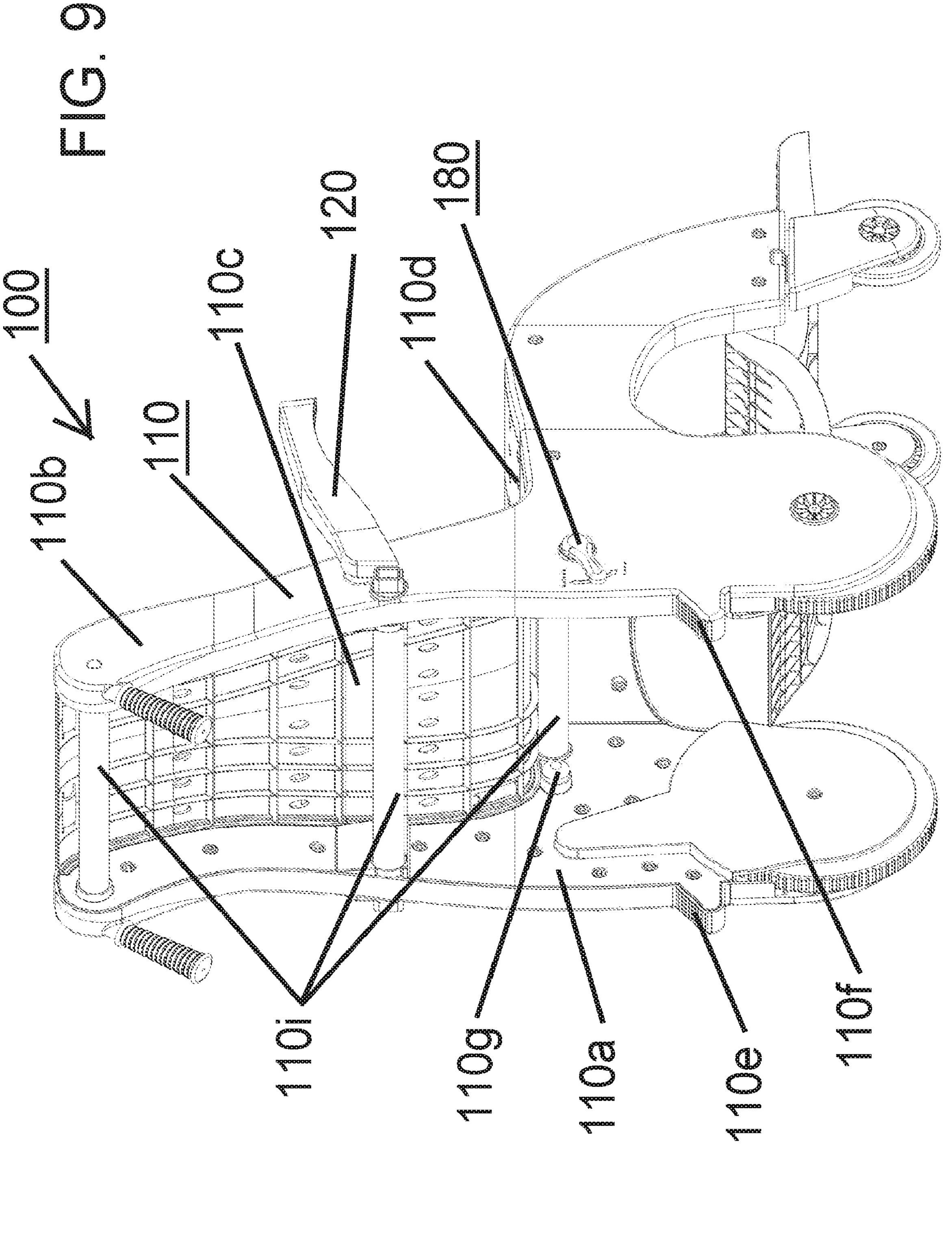
FIG. 9 is a perspective view of an embodiment of the present invention.

In some embodiments, the nonmetallic wheelchair 100 may further comprise a left tipping lever 110*e* and a right tipping lever 110*f*, as illustrated in FIGS. 3 and 9. A driver, who is pushing the nonmetallic wheelchair 100, may use her foot to apply pressure on either the left tipping lever 110*e* or the right tipping lever 110*f* to facilitate tipping the nonmetallic wheelchair 100 backwards. Tipping the nonmetallic wheelchair 100 may be beneficial in certain situations, such as when maneuvering over a curb.

Figure 10:
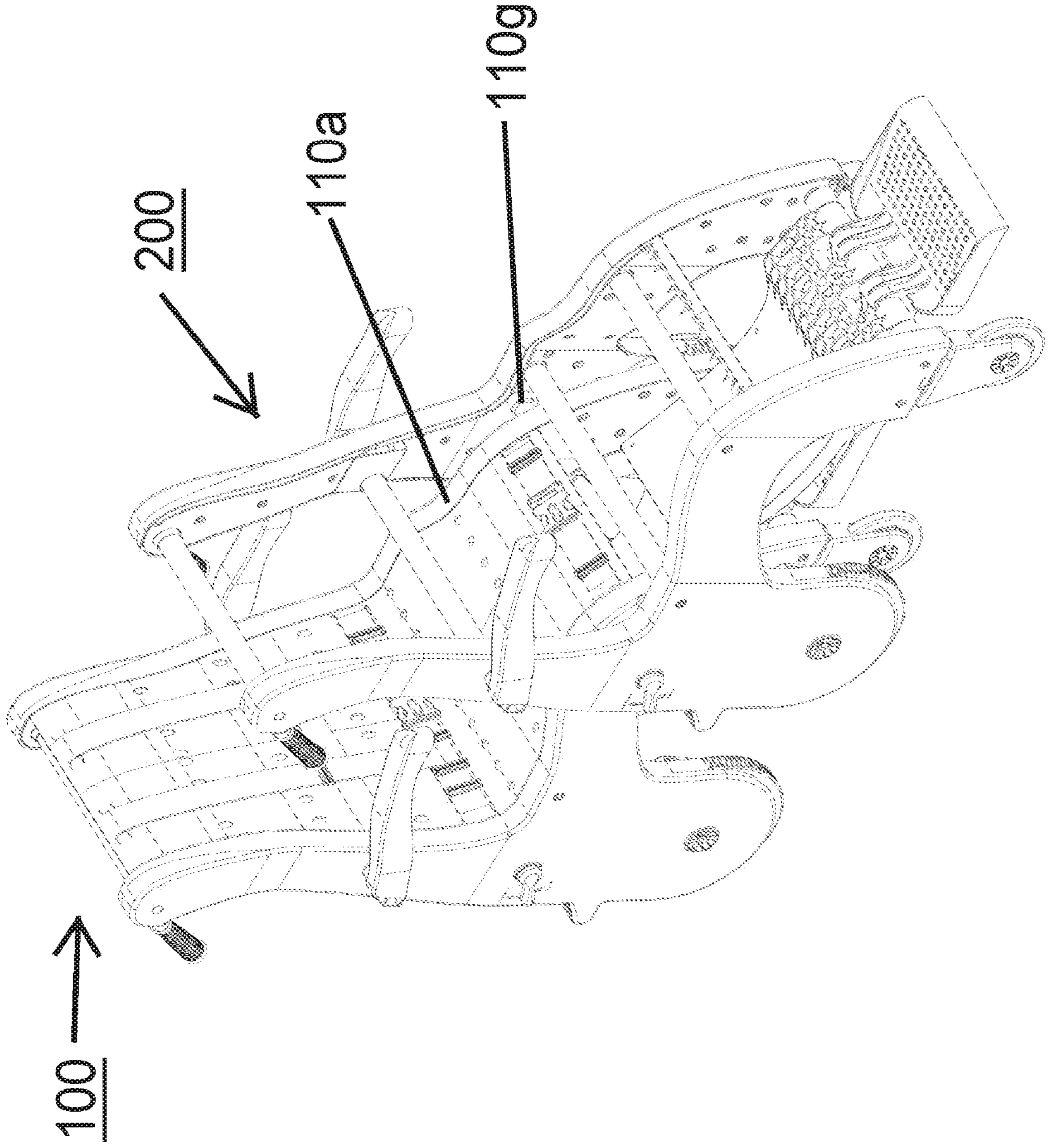
FIG. 10 is a perspective view of an embodiment of the present invention.
Figure 13:
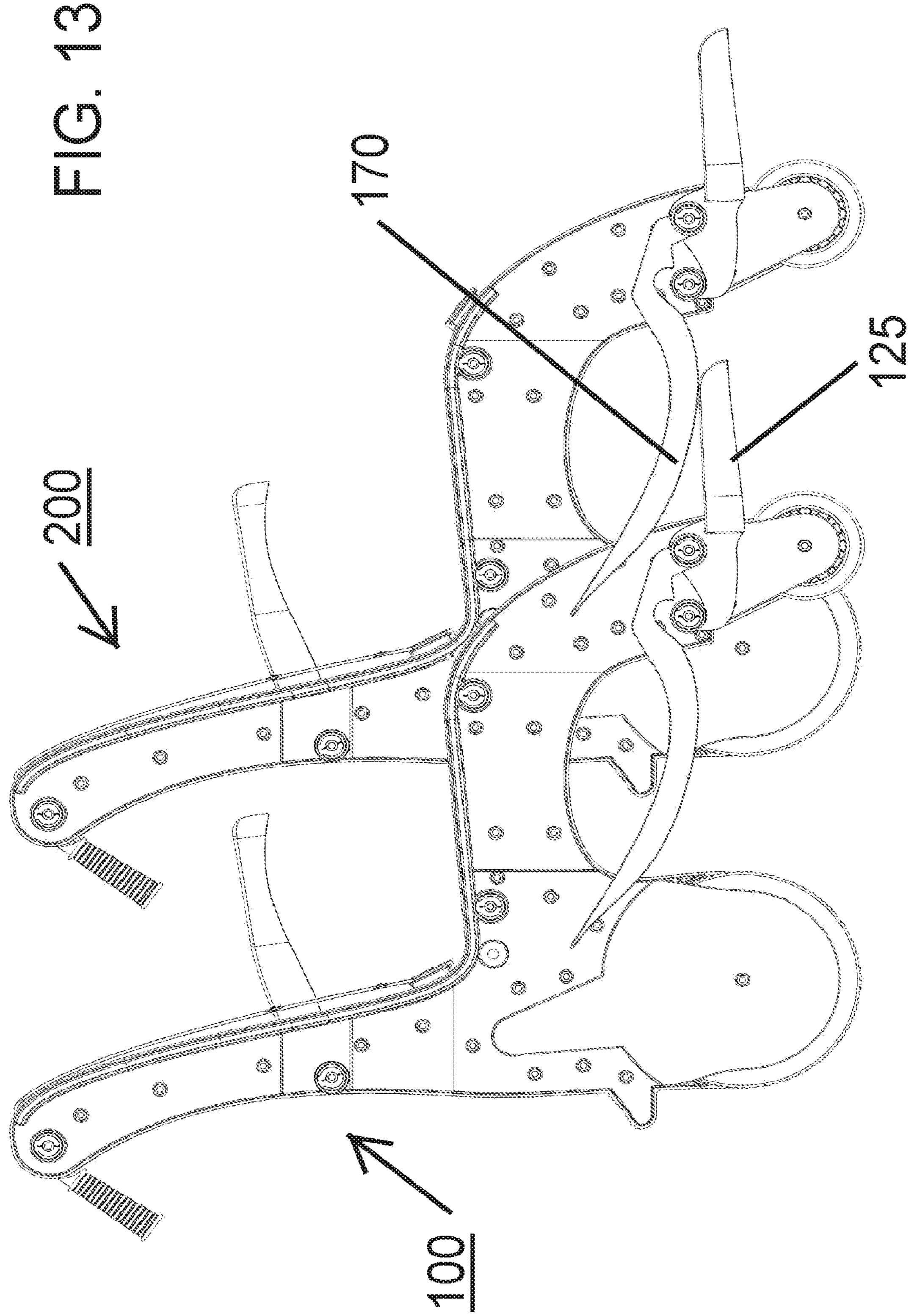
FIG. 13 is a right side view of an embodiment of the present invention.

In some embodiments, the nonmetallic wheelchair 100, 200 may be stackable, as illustrated in FIGS. 10 and 13. The nonmetallic wheelchairs 100, 200 may be configured to be stackable, which is advantageous for saving space and transporting the nonmetallic wheelchairs 100, 200. In some embodiments, the frame 110 may further comprise a left rubber stopper 110*g* and a right rubber stopper 110*h*, as illustrated in FIGS. 3, 9 and 10. The left rubber stopper 110*g* and the right rubber stopper 110*h* act to stabilize and reduce lateral movement when two or more nonmetallic chairs 100, 200 are stacked together. The left rubber stopper 110*g* and the right rubber stopper 110*h* also serve to protect one nonmetallic wheelchair 100 from a second nonmetallic wheelchair 200, as illustrated in FIG. 10. The second nonmetallic wheelchair in FIG. 10 does not have the back section 110*c* and the seat section 110*d* for illustrative and clarity purposes. As illustrated, the left rubber stopper 110*g* of the second nonmetallic wheelchair 200 snugly presses against the main left panel 110*a* of first nonmetallic wheelchair 100. Although not shown, the right rubber stopper 110*h* of the second nonmetallic wheelchair 200 snugly presses against the main right panel 110*b* of first nonmetallic wheelchair 100. This prevents any lateral movement of the first nonmetallic wheelchair 100, which prevents the potential collision damage to the nonmetallic wheelchairs 100, 200. Furthermore, the left rubber stopper 110*g* and the right rubber stopper 110*h* of the second nonmetallic wheelchair 200 prevents the front of the first nonmetallic wheelchair 100 from striking the back of the second nonmetallic wheelchair 200, which also reduces potential collision damage to the nonmetallic wheelchairs 100, 200.

Figure 11:
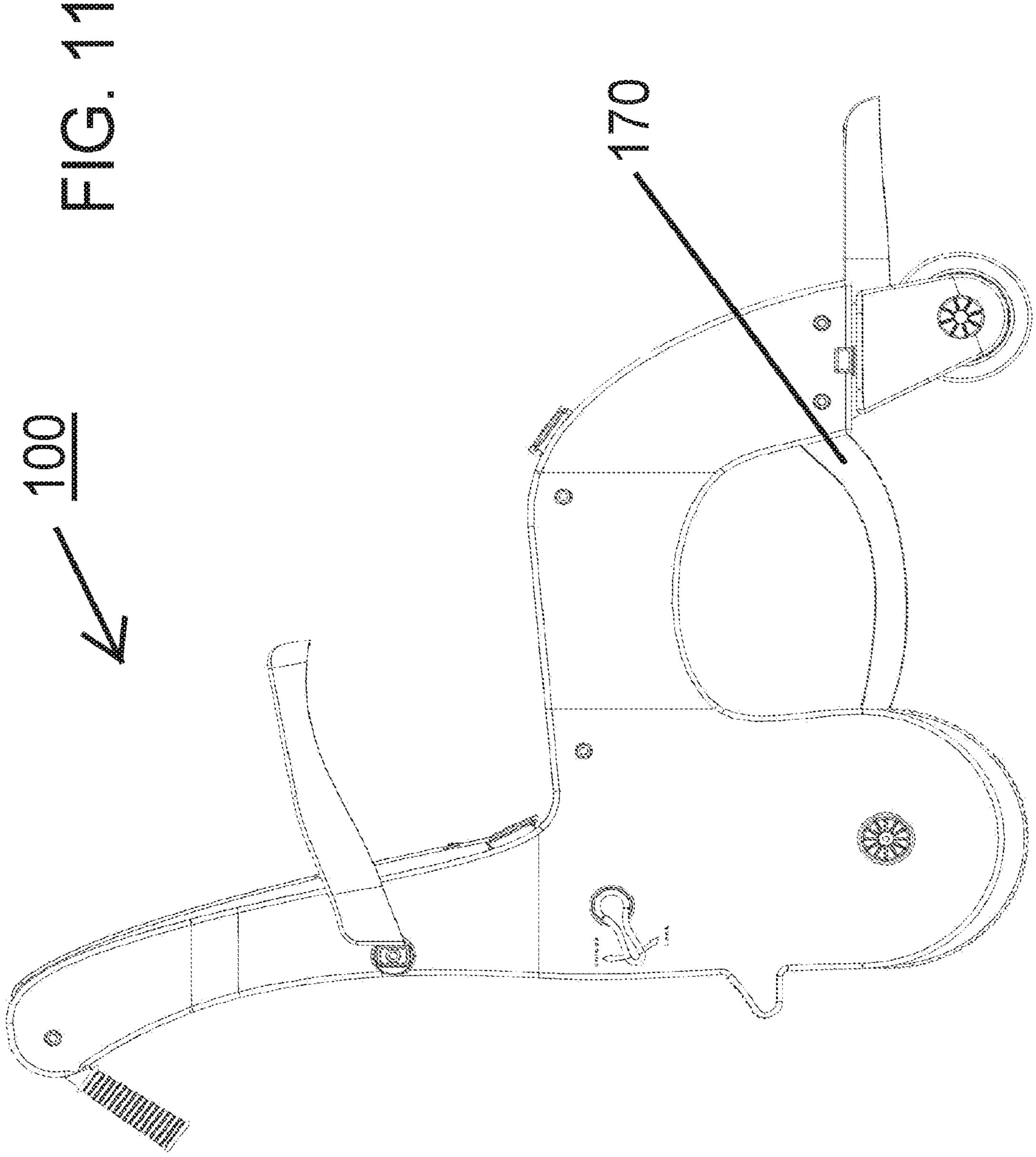
FIG. 11 is a right side view of an embodiment of the present invention.
Figure 12:
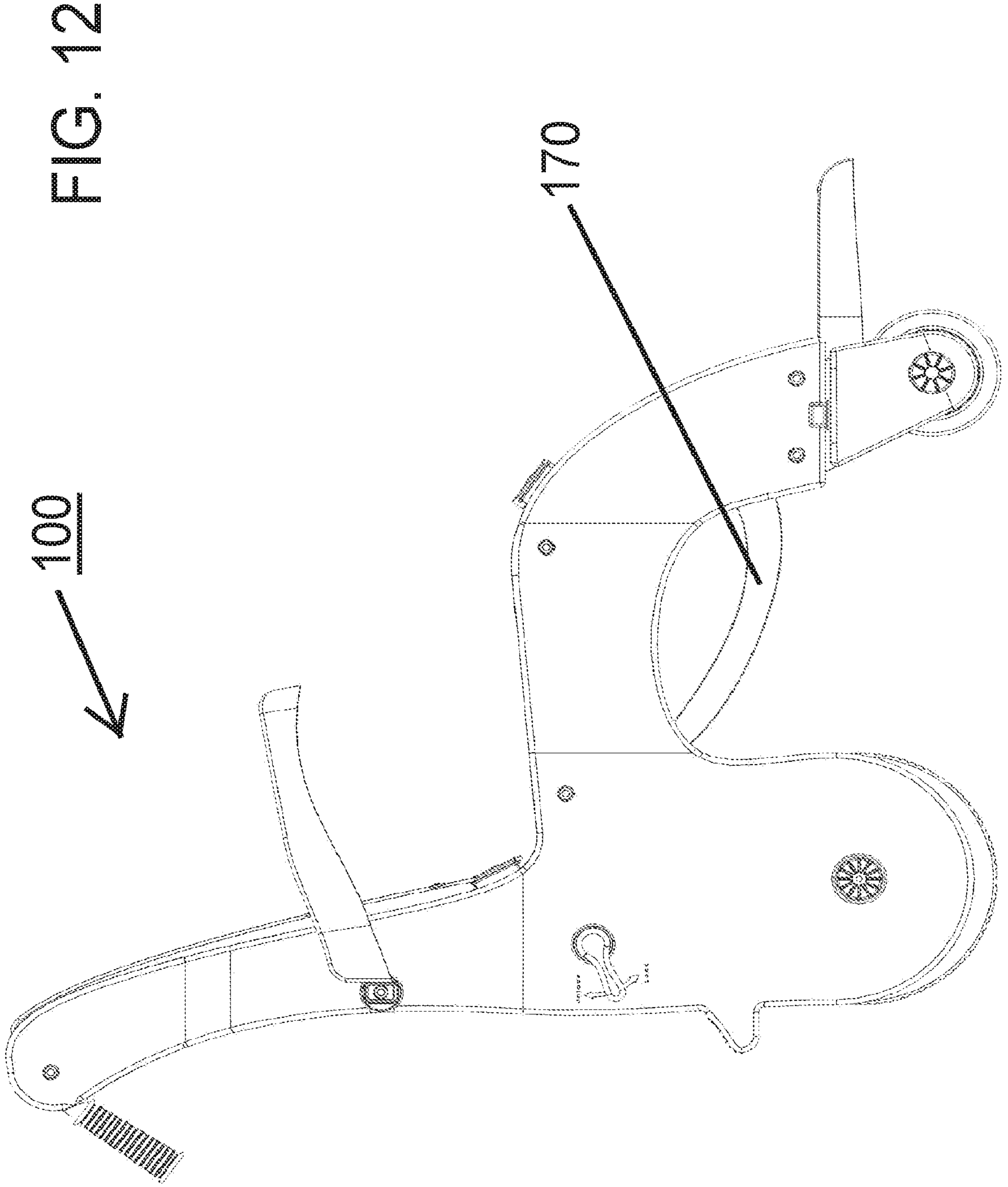
FIG. 12 is a right side view of an embodiment of the present invention.

Additionally, in some embodiments, the baggage tray 170 may be pivoted to facilitate stacking of the nonmetallic wheelchairs 100, 200, as illustrated in FIGS. 11, 12 and 13. FIG. 11 illustrates the baggage tray 170 pivoted in the down position and FIG. 12 illustrates the baggage tray 170 pivoted in the up position. As illustrated in FIG. 13, the first nonmetallic wheelchairs 100 may be stacked with the second nonmetallic wheelchair 200 when the baggage tray 170 of the second nonmetallic wheelchair 200 is pivoted in the up position. The footrest 125 of the first nonmetallic wheelchair 100 may be configured to aid in the stacking by pivoting the baggage tray 170 of the second nonmetallic wheelchair 200 when the first nonmetallic wheelchair 100 is pushed into the back of the second nonmetallic wheelchair 200.

As illustrated in FIGS. 3, 7, 8 and 9, some embodiments may include support rods 110*i* and assembly means 220. The support rods 110*i* may aid the structural integrity of the nonmetallic wheelchair 100. The support rods 110*i* may further assist in pivoting the left armrest 115, the right armrest 120, the footrest 125, and the baggage tray 170. The assembly means 220 may include, but are not limited to, screws, bolts, clamps, and rings. The assembly means 220 may be utilized in the assembly of the nonmetallic wheelchair 100. Like the other parts of the nonmetallic wheelchair 100, the support rods 110*i* and assembly means 220 are nonmetallic, and preferably transparent.

In some embodiments, as illustrated in FIGS. 7 and 8, the nonmetallic wheelchair 100 may be composed of modular parts, thereby allowing ease of repairing or replacing parts. Also, some components may be made of several modular parts, for example, the main left panel 110*a* and the main right panel 110*b* are illustrated in FIGS. 7 and 8 as having at least two modular parts. The figures are illustrative, as the the main left panel 110*a* and the main right panel 110*b* may be manufactured as a single modular part.

In some embodiments, each of the first, second, third, fourth, fifth, sixth, seventh and eighth nonmetallic material may be selected from the group consisting of polycarbonate, rubber, clear rubber, wood, carbon fiber, thermoplastics, clear polycarbonate, tinted polycarbonate, ultraviolet resistant polycarbonate, methyl methacrylate, glass, transparent composites, glass fibers, resins, transparent fiber-reinforced composites, transparent plastic polymers, general purpose polystyrene, styrene acrylonitrile, styrene methyl methacrylate, poly(methyl methacrylate), and combinations thereof. The nonmetallic materials allow the nonmetallic wheelchair 100 to pass through metal detectors without triggering the alarms.

In some embodiments, each of the first, second, third, fourth, fifth, sixth, and seventh nonmetallic material may be polycarbonate. In some embodiments, the polycarbonate may be transparent.

In some embodiments, the eighth nonmetallic material may be clear rubber. In some embodiments, the clear rubber may be transparent.

The term "transparent" may include materials that are transparent and translucent. Generally, objects may have degrees of transparency, from completely transparent to opaque. "Transparent" includes materials that reduce the ability to hide or conceal objects because any hidden or concealed objects will be visible through the transparent materials used in some embodiments of the present invention. This transparency optimizes security.

Thermoplastic polymers include, but are not limited to, grades of thermoplastic polymers that are optically transparent. Examples of optically transparent thermoplastic polymers include, but are not limited to, polycarbonate and methyl methacrylate. Different types of polycarbonate include, but are not limited to, clear polycarbonate, tinted polycarbonate, ultra violet resistant polycarbonate (UV PC). Tinted polycarbonate may be tinted with any color and preferably the tinting maintains the materials' transparency. UV PC may be utilized in applications where the present invention required UV resistance, including, but not limited to, hospital applications.

Methyl methacrylate may also be known as acrylic or acrylic glass. Transparent composites, for example, may be made from nylon and polyacrylonitrile (PAN), where the nylon is embedded into an epoxy matrix and the PAN into poly(methyl methacrylate) (PMMA). Transparent fiber-reinforced composites, include, but are not limited to, mechanically strong composite materials of high optical quality and transparency equivalent to window glass, which may be achieved, for example, by layering a polymer matrix reinforced with glass ribbons and a tough compliant polyurethane film. Transparent plastic polymers, include, but are not limited to, general purpose polystyrene (GPPS), styrene acrylonitrile (SAN), styrene methyl methacrylate (SMMA), and poly(methyl methacrylate).

Embodiments of the present invention preferably utilize nonmetallic materials that are sufficiently strong and rigid, yet lightweight, for this application. As a result, the embodiments are lighter and stronger than standard wheelchairs. Furthermore, the nonmetallic materials are preferably transparent.

Preferably, the embodiments of the present invention may be ergonomically designed for the comfort of the user.

Not all elements in the figures have been labeled for clarity purposes.

While the invention has been described with reference to exemplary embodiments, it will be understood by those skilled in the art that various changes, omissions, and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiments disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A wheelchair, comprising:

a transparent frame including a first side panel, a second side panel, a back section between the first and second side panels, a seat section between the first and second side panels, and a baggage tray below the seat section;

a plurality of wheels rotatably coupled to the frame; and at least one handle coupled to the frame, wherein the wheelchair is entirely nonmetallic, wherein the baggage tray is pivotably coupled about a support extending between the first and second side panels.

2. The wheelchair of claim 1, wherein the plurality of wheels is transparent.

3. The wheelchair of claim 1, wherein the at least one handle is transparent.

4. The wheelchair of claim 3, wherein the at least one handle is at least partially comprised of a transparent rubber.

5. The wheelchair of claim 1, further comprising a nonmetallic and transparent armrest coupled to one of the first side panel or the second side panel.

6. The wheelchair of claim 1, further comprising a nonmetallic and transparent footrest pivotably coupled to the frame.

7. The wheelchair of claim 1, further comprising a nonmetallic seatbelt including a nonmetallic seatbelt buckle.

8. The wheelchair of claim 1, wherein the frame is made of a transparent polycarbonate material.

9. The wheelchair of claim 1, further comprising a plurality of supports extending between the first side panel and the second side panel, each of the plurality of supports being nonmetallic and transparent.

10. The wheelchair of claim 9, further comprising a plurality of assembly fasteners securing the plurality of supports to the first side panel and the second side panel, each of the plurality of assembly fasteners being nonmetallic and transparent.

11. The wheelchair of claim 1, wherein the support nonmetallic and transparent.

12. The wheelchair of claim 11, wherein the baggage tray is pivotable between a lowered position for receiving baggage and a raised position.

13. The wheelchair of claim 12, wherein the wheelchair is configured to stack with a second wheelchair when the baggage tray is in the raised position without removing any component of the wheelchair.

14. The wheelchair of claim 1, further comprising a nonmetallic braking mechanism including a nonmetallic lever and a nonmetallic braking pad.

15. The wheelchair of claim 14, wherein the nonmetallic lever is transparent and rotatably connected to one of the first or second side panels.

16. The wheelchair of claim 1, further comprising a nonmetallic and transparent tipping lever on each of the first side panel and the second side panel.

17. The wheelchair of claim 1, wherein the plurality of wheels includes a first rear wheel adjacent to an inside surface of the first side panel and a second rear wheel adjacent to an inside surface of the first side panel, each of the first rear wheel and the second rear wheel being transparent.

18. The wheelchair of claim 17, wherein the plurality of wheels includes a first front wheel pivotably and rotatably attached to the first side panel and a second front wheel pivotably and rotatably attached to the second side panel, each of the first front wheel and the second front wheel being transparent.

19. A wheelchair, comprising:

a transparent frame including a first side panel, a second side panel, a back section between the first and second side panels, a seat section between the first and second side panels;

a plurality of wheels rotatably coupled to the frame;

at least one handle coupled to the frame; and a cavity defined between the first side panel, the second side panel, and a bottom surface of the seat section, the cavity extending from below the seat section and through a rear portion of the frame, wherein the cavity is configured to at least partially receive and nest with a second one of the wheelchairs through the rear portion of the frame, wherein the wheelchair is entirely nonmetallic.

20. The wheelchair of claim 19, further comprising a baggage tray positioned in the cavity and pivotable between the first and second side panels between a lowered position and a raised position.

21. The wheelchair of claim 19, wherein the plurality of wheels includes a first rear wheel adjacent to an inside surface of the first side panel and a second rear wheel adjacent to an inside surface of the first side panel, each of the first rear wheel and the second rear wheel being transparent.

* * * * *